Inventor
Chester W. Greene
By his Attorney

Inventor
Chester W. Greene
By his Attorney

Fig. 10.

March 11, 1947.      C. W. GREENE      2,417,300
MUZZLE COVER OPERATING MECHANISM FOR GUNS
Filed Nov. 17, 1944      9 Sheets-Sheet 7

Inventor
Chester W. Greene
By his Attorney

Inventor
Chester W. Greene
By his Attorney

March 11, 1947. C. W. GREENE 2,417,300
MUZZLE COVER OPERATING MECHANISM FOR GUNS
Filed Nov. 17, 1944 9 Sheets-Sheet 9

Inventor
Chester W. Greene
By his Attorney

Patented Mar. 11, 1947

2,417,300

UNITED STATES PATENT OFFICE 2,417,300

MUZZLE COVER OPERATING MECHANISM FOR GUNS

Chester W. Greene, Lynn, Mass., assignor to United Shoe Machinery Corporation, Flemington, N. J., a corporation of New Jersey Application November 17, 1944, Serial No. 563,874

11 Claims. (Cl. 89—31)

This invention relates to ordnance and is illustrated herein as applied more particularly to a gun provided with a muzzle cover.

An object of the invention is to provide in a gun having a cover normally closing the muzzle end thereof, improved mechanism for loading the gun, opening the muzzle cover and immediately thereafter firing the gun, the muzzle cover returning to closed position upon recoil of the gun so that the muzzle is open only long enough to permit firing the gun. To this end and in accordance with a feature of the invention, the muzzle cover is formed of a plurality of plates pivoted to a sleeve surrounding the gun tube, the plates meeting forwardly of the muzzle end of the gun to form a closure therefor. Rounds are automatically transferred from a rounds magazine associated with the gun by a transfer tray which transports the rounds into alinement with the gun after which they are rammed thereinto and the return movement of the transfer tray into position to receive another round causes retraction of the sleeve and opening of the muzzle cover and then causes operation of the firing mechanism. The sleeve is latched in retracted position and the latch mechanism is released in response to recoil of the gun.

The rounds are indexed in the magazine during the loading of a round into the gun and a drive shaft is provided to operate the indexing means, the transfer means and the ramming means in a predetermined sequence. Fuse-setting mechanism is provided for setting the fuse in the round immediately before it is removed from the magazine and the operation of the drive shaft is initiated by the fuse-setting mechanism at the conclusion of the fuse-setting operation. During loading of the magazine, the fuse-setting mechanism is rendered inoperative and other means is provided for initiating operation of the drive shaft to index the rounds therein. In accordance with another feature of the invention, the transfer mechanism is rendered ineffective during this time to carry rounds from the magazine into ramming position and to cause opening of the muzzle cover so that the muzzle cover remains closed during loading of the magazine.

The above, including various novel combinations of parts and details of construction, will now be described in detail by reference to the accompanying drawings and pointed out in the claims.

The invention is illustrated as embodied in a gun-loading mechanism of the type illustrated in application for Letters Patent of the United States, Serial No. 537,267, filed May 25, 1944, in the name of Otto R. Haas, to which reference may be had for a complete description of those parts not described in detail herein.

Figure 1:
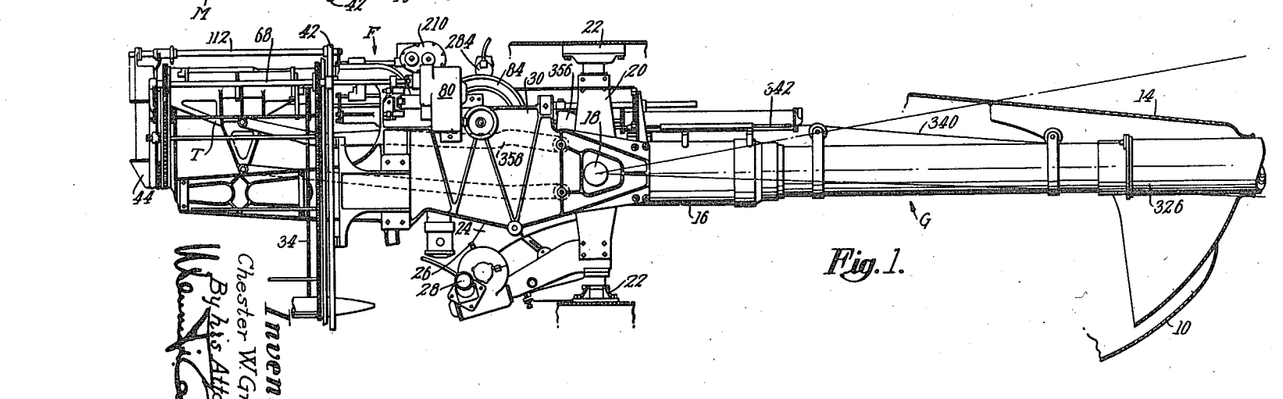
Fig. 1 is a side elevation of a gun and one form of loading mechanism in which the present invention is embodied.
Figure 2:
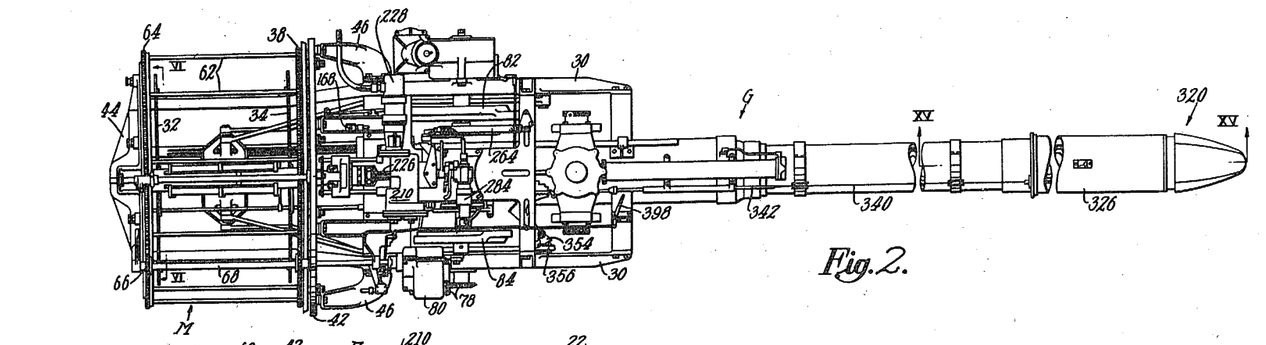
Fig. 2 is a plan view of the gun and loading mechanism shown in Fig. 1.

The loading mechanism is associated with a gun G, Figs. 1 and 2, which may be mounted in the nose 10 of an airplane, the nose of the plane being provided with a movable shield 14 permitting movement of the gun in elevation. The gun is mounted in a cradle 16 which is in turn carried by trunnions 18 in a yoke 20. This yoke is secured by brackets 22 to the interior of the plane, and the yoke may be mounted in the brackets for movement about a vertical axis, if desired, to permit movement of the gun in azimuth. For moving the gun in elevation the cradle 16 is provided with a rearwardly extending arm 24 carrying a gear segment 26 meshing with a gear, not shown, driven by a motor 28 which may be controlled in any suitable manner.

Carried by and extending rearwardly of the cradle 16 are a pair of arms 30 forming a carriage for a rounds magazine M in which a plurality of rounds are carried and are indexed step by step to a release station at which the fuse of each round is set by a fuse-setting mechanism F, the round then being carried by a transfer tray T into alinement with the bore of the gun, after which the round is moved by a rammer R (Figs. 3 and 6) into the gun and fired.

Figure 3:
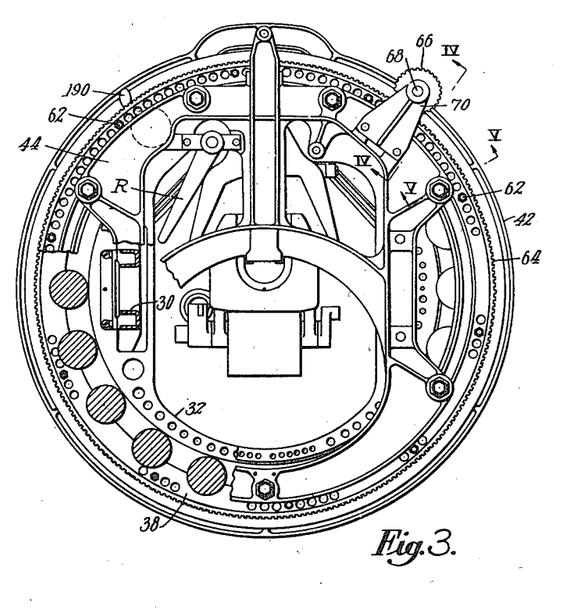
Fig. 3 is an end elevation, partly in section, of the rounds magazine.
Figure 4:
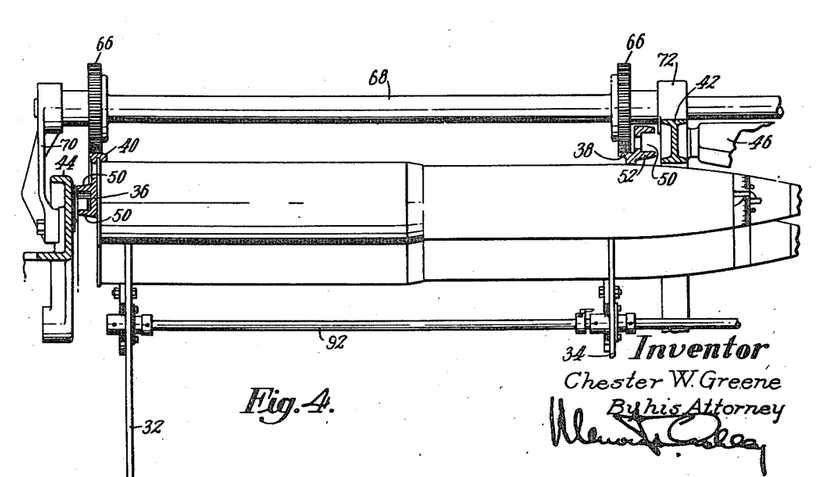
Fig. 4 is a section on the line IV—IV of Fig. 3.
Figure 5:
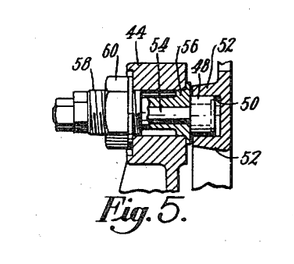
Fig. 5 is a section on the line V—V of Fig. 3.

As shown more clearly in Figs. 3 to 8, the rounds magazine comprises a pair of inner rings 32, 34 and a pair of outer rings 36, 38 concentrically disposed with respect to the inner rings and the gun and forming an annular space therebetween for a plurality of rounds of ammunition. The inner rings 32, 34 are rigidly carried by the rearward portions of the arms 30 of the carriage. The outer rings 36, 38 are rotatably mounted with respect to the inner rings of the magazine, the ring 36 carrying rounds-retaining members 40 for moving the rounds in a circular path around the peripheries of the inner rings 32, 34. The ring 38 is recessed as shown in Fig. 3 to receive the forward portions of the rounds. For supporting the outer rings 36, 38, front and rear frame members 42, 44 are carried respectively by arms 46 (Fig. 2) extending outwardly and rearwardly from the side walls 30 of the carriage and by the rear ends of the walls 30. The frame members 42, 44 (Fig. 4) carry rolls 48 (Fig. 5) received in grooves 50 formed between flanges 52 in the rings 36 and 38. The rolls 48 are journaled on shafts 54 which are carried by bushings 56 having eccentric bores therein to provide for adjustment of the rolls with respect to their supporting frame members, thereby to permit adjustment of the outer rings with respect to the inner rings of the magazine. The exterior portions of the bushings 56 are threaded at 58 to receive lock nuts 60 for locking the bushings in their properly adjusted positions.

The outer rings 36 and 38 are connected by a plurality of tie rods 62 (Figs. 3 and 6) so that they form a unitary structure. Rack teeth 64 are formed on the peripheries of the rings 36 and 38 for engagement with drive pinions 66 carried by a shaft 68, the rearward end of which is journaled in a bracket 70 (Fig. 4) extending upwardly from the rear frame member 44. The drive shaft 68 is also journaled in a bearing 72 carried by the front frame member 42 and by a bracket 74 (Fig. 10) secured to the carriage and extending laterally therefrom. Following each fuse-setting operation and release of a round from the magazine, the shaft 68 is turned a half revolution thereby to move the outer rings 36 and 38 a sufficient distance to index another round into fuse-setting position. The shaft 68 is driven from a cam shaft 76, journaled in the gun carriage, through bevel gearing 78 and a variable speed mechanism 80 which is preferably of a type which causes slow starting and stopping of the drive shaft 68 and rapid movement of the shaft between the starting and stopping portions of the cycle of operation. One form of mechanism that may be employed is illustrated in the James Patent No. 2,309,595, granted January 26, 1943. The cam shaft 76 may be driven through a one-revolution clutch mechanism of the type shown in the aforementioned application.

At the release station located at the top of the magazine, the inner rings 32 and 34 are cut away to permit downward movement of a round by the transfer tray T. The construction and operation of this tray are similar in all respects to that of the aforementioned Haas application to which reference may be had for a complete description thereof. For the purposes of the present invention it is sufficient to say that the tray T is operated by cams 82, 84 which operate the tray in timed relation to the operation of the indexing shaft 68 and the rammer.

Figures 6, 7, 8, 9:
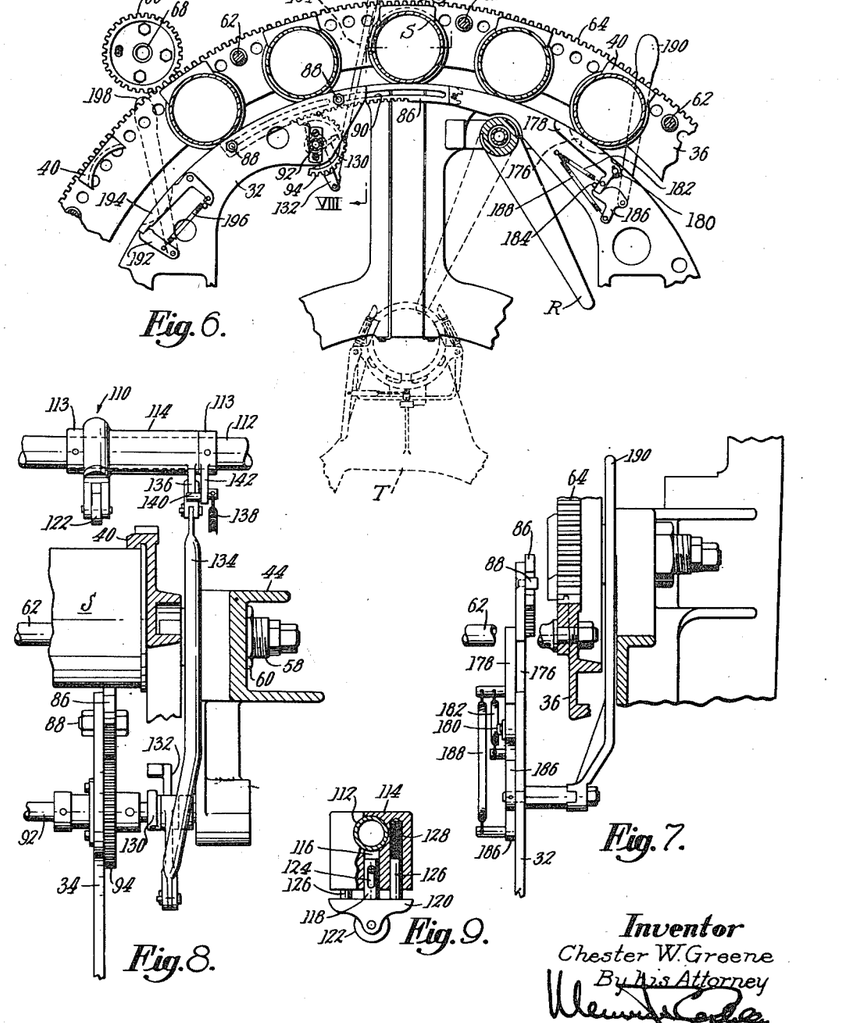
Fig. 6 is a section on the line VI—VI of Fig. 2.
Fig. 7 is a vertical section through the rear portion of the magazine at one of the loading stations.
Fig. 8 is a section on the line VIII—VIII of Fig. 6.
Fig. 9 is a detail view, partly in section, of mechanism for ejecting a round from the magazine following the fuse-setting operation.

For holding the rounds in the magazine at the release station during the fuse-setting operation, the inner rings 32, 34 are provided with gates 86 carried for sliding movement by bolts 88 passing through slots 90 in the gates. With the gates positioned as shown in Fig. 6 the rounds are retained in the magazine, but upon retraction of the gates the rounds may move downwardly through the openings in the inner rounds-supporting rings. For thus operating the gates a shaft 92 (Fig. 4), journaled in the rings 32, 34, is provided with gear segments 94 (Figs. 6 and 8) which mesh with rack teeth formed on the under surfaces of the gates 86. Upon movement of the shaft 92 (Fig. 6) in a counterclockwise direction the gates are retracted. For thus operating the shaft 92 it is connected at its forward end by a clutch 96 (Fig. 10) and a gear 98 to a gear segment 100 formed on the rearward end of an arm 102 pivoted at 104 to the carriage and provided with a cam follower 106 received in a groove in a cam 108 carried by the cam shaft 76. Upon rotation of the cam shaft 76 the shaft 92 is oscillated first to retract the gates 86 and then to return them to their closed positions.

In order to insure release of the round from the magazine provision is made for forcibly moving it downwardly during the last portion of the opening movements of the gates and at the beginning of the downward movement of the transfer tray T. For this purpose an ejector 110 (Fig. 6) is carried by a shaft 112 secured in the top of the magazine. The ejector consists of a block 114 journaled on the shaft 112 at its rearward portion between collars 113 (Fig. 8) and provided with a downwardly extending bore 116 (Fig. 9) for slidably receiving the shank portion 118 of a support 120 for a rounds-engaging roll 122. A pin and slot connection 124 between the block and the shank 118 limits downward movement of the support 120 relatively to the block. Pins 126, carried by the support 120, extend upwardly into bores in the block 114 to prevent rotation of the support relatively to the block. Compression springs 128 act on the pins 126 normally to hold the block 120 with its roll 122 in the position shown in Fig. 9. Upon clockwise movement of the shaft 112, as viewed in Fig. 6, the roll 122 engages the round S and exerts a downward force thereon forcibly to eject the round from the magazine. The compression springs 128 permit yielding movement of the roll 122 relatively to the block 114.

The shaft 112 is operated from the gates-operating shaft 92 toward the end of the gates-opening movement. For this purpose the shaft 92 carries an arm 130 (Figs. 6 and 8) engageable with the upper end of an arm 132, loosely mounted on the shaft 92, after a predetermined movement of the shaft, whereupon the arm 132 is caused to move with the shaft. The arm 132 extends below the shaft 92 and is connected by a link 134 to an arm 136 projecting outwardly from the block 114. A spring 138 normally holds the rounds ejector in the position shown in Fig. 6 with the arm 136 in engagement with a stop pin 140 carried by an arm 142 depending from the rearmost collar 113.

During manual loading of the magazine, the gate-operating mechanism is rendered inoperative so that upon indexing of the rounds during the loading operation they will not leave the magazine at the release station. For this purpose the clutch 96 (Fig. 10) is thrown out. This clutch includes a clutch element 144 splined on the shaft 92 and arranged to be moved by a bell crank lever 146 connected by a link 148 to a lever 150 pivoted to a bracket 152 on the carriage. A handle 154 at the rearward end of the lever 150 is provided for moving the lever in the direction of the arrow (Fig. 10) thereby to move the movable clutch element 144 rearwardly to disengage the shaft 92 from the driving means. The lever 150 carries a spring-pressed detent arranged to engage one of a pair of recesses in a bracket 156 thereby to hold the lever in one of two different positions. The bell crank lever 146 is also connected by a link 158 to a bell crank lever 160 which is in turn connected by a link 162 to a switch actuating arm 164 (Fig. 11) pivoted to a bracket 166 extending outwardly from one of the arms 30 of the carriage. Upon movement of the lever 150 (Fig. 10) to disconnect the gates-operating shaft 92 from the cam shaft 76, the arm 164 (Fig. 11) is swung to close a switch 168 which is in series with a loading switch 170 (Figs. 10 and 31) so that upon manual closure of the loading switch a clutch solenoid 172 (Fig. 31) is energized to cause rotation of the cam shaft 76 through one revolution. With the lever 150 (Fig. 10) in the position illustrated, the switch 168 (Fig. 11) is open and a switch 174 is closed. The function of this switch will appear as the description proceeds.

To enable loading of the rounds in the magazine the inner ring 32 is recessed at 176 (Fig. 6) so that the back end of the shell may be inserted between the ring 32 and the rounds-retaining members 40. The continuity of the outer surface of the ring 32 is maintained by a plate 178 pivoted at 180 to the ring and urged upwardly by a spring 182 into the position shown in Fig. 6 determined by engagement with a pin 184 carried by the ring 32. A latch 186 engages a downwardly projecting portion of the plate 178 to prevent depression of the plate when the latch is in the position illustrated in Fig. 6 in which it is normally held by a spring 188. A handle 190 is connected to the latch to turn it in a counterclockwise direction thereby to release the plate 178 so that it may be depressed by pressure exerted thereon by a round of ammunition during the loading operation, thus facilitating insertion of the round between the ring 32 and the round-retaining members 40. At the other side of the magazine is provided an additional loading station of similar construction, there being a latch 192 normally holding a plate 194 in the position shown. The latch and the plate are connected by a spring 196 and a handle 198 secured to the latch is provided for moving it out of engagement with the plate which may thereupon be depressed by pressure exerted thereon.

A cycle of operations is initiated by setting the fuse of a round located at the release station in the magazine. The fuse-setting apparatus is carried by a support 200 (Fig. 20) extending between and secured to the arms 30 of the carriage forwardly of the magazine.

Figures 20, 21, 22:
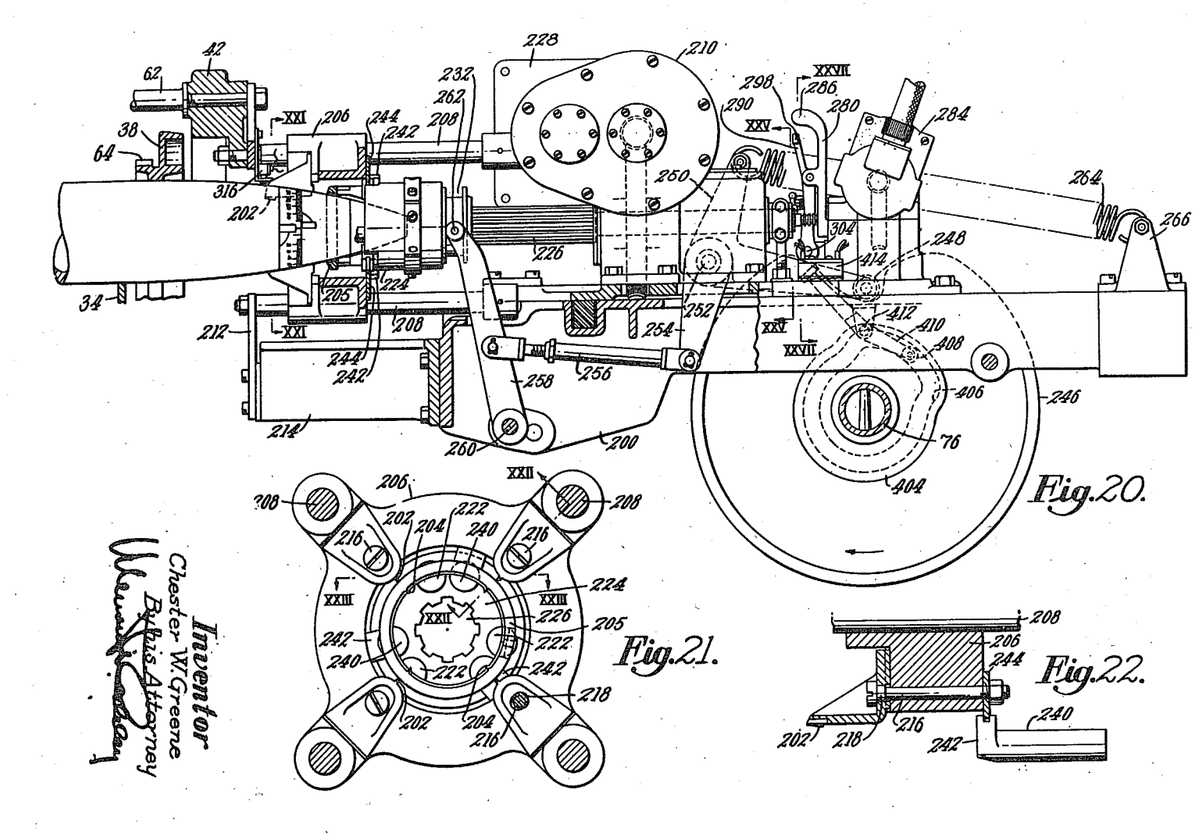
Fig. 20 is a side elevation, partly in section, of the fuse-setting mechanism.
Fig. 21 is a section on the line XXI—XXI of Fig. 20.
Fig. 22 is a section on the line XXII—XXII of Fig. 21.

The fuse-setting mechanism comprises a set of four knives 202 (Fig. 21), arranged to engage the nose of the round rearwardly of the fuse ring for locking the round against rotation during the fuse-setting operation, and a second set of four knives 204 engageable with the fuse ring of the round and carried by a ring 205 rotatable to set the fuse a predetermined amount. The knives 202 are carried by a support 206 arranged for sliding movement toward and away from the magazine. For thus carrying the support 206 four rods 208 are provided, the upper rods being carried at their rearward ends by the front frame member 42 and at their forward ends by a gear housing 210. The other pair of rods 208 are carried at their forward ends by the support 200 and at their rearward ends by a plate 212 secured to a bracket 214 extending rearwardly from the support 200. The knives 202 are adjustably carried by the support 206 as shown in Fig. 22 by screws 216 provided with eccentric portions 218 engageable with apertures in vertical extensions of the knives.

Figure 23:
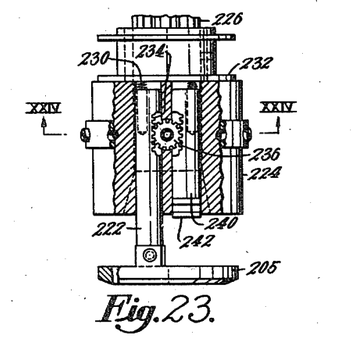
Fig. 23 is a section on the line XXIII—XXIII of Fig. 21.
Figure 24:
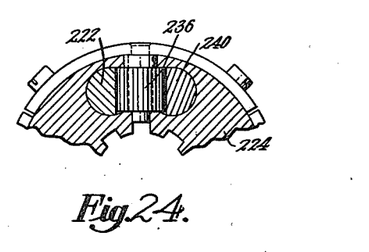
Fig. 24 is a section on the line XXIV—XXIV of Fig. 23.

The fuse-setting knives 204 are formed on the inner surface of the ring 205 to the forward side of which are secured three forwardly extending cylindrical bars 222 (Figs. 21 and 23) slidable in a head 224 which is in turn slidable on a splined shaft 226 extending rearwardly from the gear housing 210 and connected through suitable reduction gearing to a fuse-setter motor 228. The ring 205 is urged rearwardly of the head 224 by springs 230 (Fig. 23) acting between the forward ends of the bars 222 and a flanged sleeve 232 secured to the front of the head 224. The bars 222 are formed with rack teeth 234 engaged by gears 236 journaled in the head 224. The gears 236 also engage rack teeth formed on slidable bars 240 the rearward portions of which are provided with lugs 242 slidable in slots formed in the head 224. The lugs 242 are flanged to receive a circular plate 244 (Figs. 20 and 22) secured by the screws 216 to the support 206 on the front face thereof thereby providing a connection between the bars 240 and the support 206 carrying the knives 202. Thus the support 206, carrying the knives 202, is movable with the head 224 toward the round at the beginning of the fuse-setting operation. After the knives 202 have engaged the round, further rearward movement of the head 224 will cause rearward movement of the ring 205 carrying the knives 204 relatively to the head. This is caused by the fact that the head 224 will move rearwardly after the support 206 has come to rest and the relative movement between the bars 240 and the head 224 will act through the gears 236 to cause rearward movement of the bars 222 relatively to the head until the knives 204 have engaged the fuse ring of the round. By this arrangement the force with which the two sets of knives engage the round is equalized.

For moving the head 224 the cam shaft 76 is provided with a cam 246 with which cooperates a cam roll 248 carried by a bell crank lever 250 mounted on a shaft 252 carried by and extending outwardly of the gear housing 210. Also carried by the shaft 252 is a downwardly extending arm 254 connected by an adjustable link 256 to a lever 258 pivoted at 260 to the support 200. The upper end of the lever 258 is forked and carries rolls 262 engageable in the groove of the flanged sleeve 232. A spring 264 acting between an upwardly extending arm of the bell crank lever 250 and a bracket 266 secured to and extending upwardly from the support 200 moves the head 224 rearwardly when the cam 246 is in the position shown in Fig. 20 thereby to force the knives 202 and 204 onto the nose of the round. At the conclusion of the fuse-setting operation the cam 246 turns in the direction of the arrow and after a slight amount of rotation the bell crank lever 250 is rocked in a counterclockwise direction whereupon the head 224 is moved forwardly to carry the knives 202 and 204 out of engagement with the nose of the round.

Figure 25:
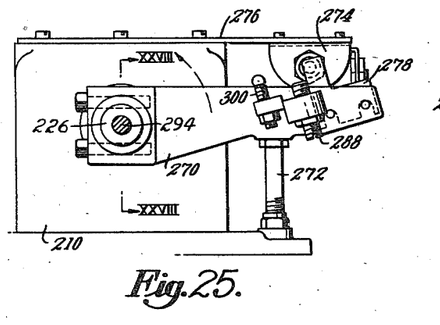
Fig. 25 is a section on the line XXV—XXV of Fig. 20.
Figure 26:
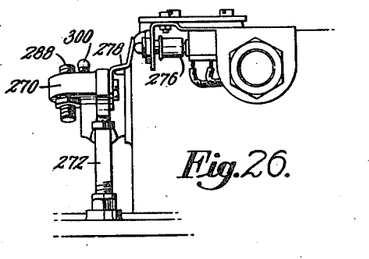
Fig. 26 is an end elevation of the mechanism shown in Fig. 25.
Figure 28:
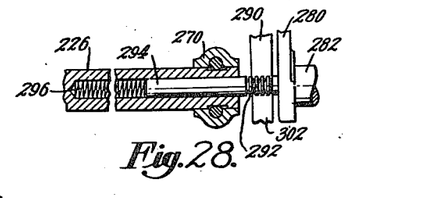
Fig. 28 is a section on the line XXVIII—XXVIII of Fig. 25.
Figure 29:
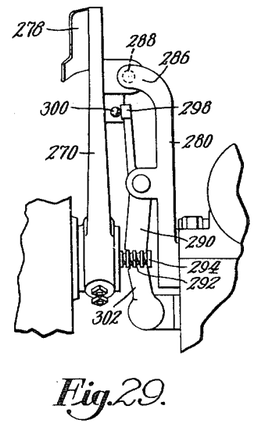
Fig. 29 is an elevation of the control arms associated with the fuse-setting mechanism.
Figure 30:
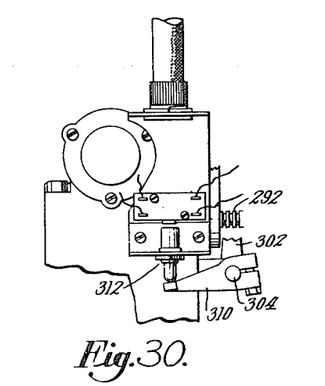
Fig. 30 is an elevation of a switch actuated by the fuse-setting mechanism at the conclusion of the fuse-setting operation.

For controlling the amount of the fuse-setting operation the splined shaft 226 extends forwardly of the gear housing and carries at its forward end a stop arm 270 (Figs. 25, 26 and 29). The initial position of the stop arm is determined by an adjustable stop screw 272 against which the arm bears when the fuse setter is in its 0 or starting position. At this time a switch 274, depending from a plate 276 secured to the gear housing 210, is held in the position shown in Fig. 31 by a switch-actuating plate 278 carried by the outer end of the stop arm 270. A control arm 280 (Figs. 28 and 29) is mounted adjacent to and just forwardly of the stop arm 270 on a shaft 282 (Fig. 28) which is driven through reduction gearing by a motor 284 (Fig. 27) which is in turn controlled by suitable equipment which forms no part of the present invention, for positioning the control arm 280 in accordance with the desired amount of fuse setting. The control arm is provided with a rearward extension 286 arranged in the path of movement of an adjustable stop screw 288 (Fig. 25) carried by the stop arm 270. Pivotally secured to the rear side of the control arm 280 is an arm 290 the lower end of which is formed as a gear segment engageable with teeth 292 (Figs. 28 and 29) in the outer end of a rod 294 slidable in a bore formed in the forward end of the shaft 226. The rod 294 is urged outwardly of the shaft 226 by a spring 296. The upper end of the arm 290 is formed with a projection 298 having a cam surface arranged to be engaged by the round end of a screw 300 adjustably carried by the stop arm 270. Accordingly, when the head 224 has rotated a predetermined amount according to the position of the control arm 280 the screw 300 engages the upper end of the arm 290 rocking it in a counterclockwise direction as viewed in Fig. 20 thus moving the rod 294 rearwardly of the shaft 226. This motion of the rod 294 is transmitted, through a segment 302 pivoted on a shaft 304 (Fig. 30) journaled in a sleeve 306 (Fig. 27) carried by a gear housing 308, to a switch-actuating arm 310 to actuate a switch 312. This switch is moved away from the position shown in Fig. 31 at the conclusion of the fuse-setting operation, this taking place at the same time that the screw 288 engages the upper end of the control arm 280, positively to stop movement of the arm 270 and rotation of the shaft 226. Movement of the switch 312 out of the position shown in Fig. 31 terminates operation of the fuse-setter motor 228 as will be later described.

Figures 15, 16, 17, 18, 19:
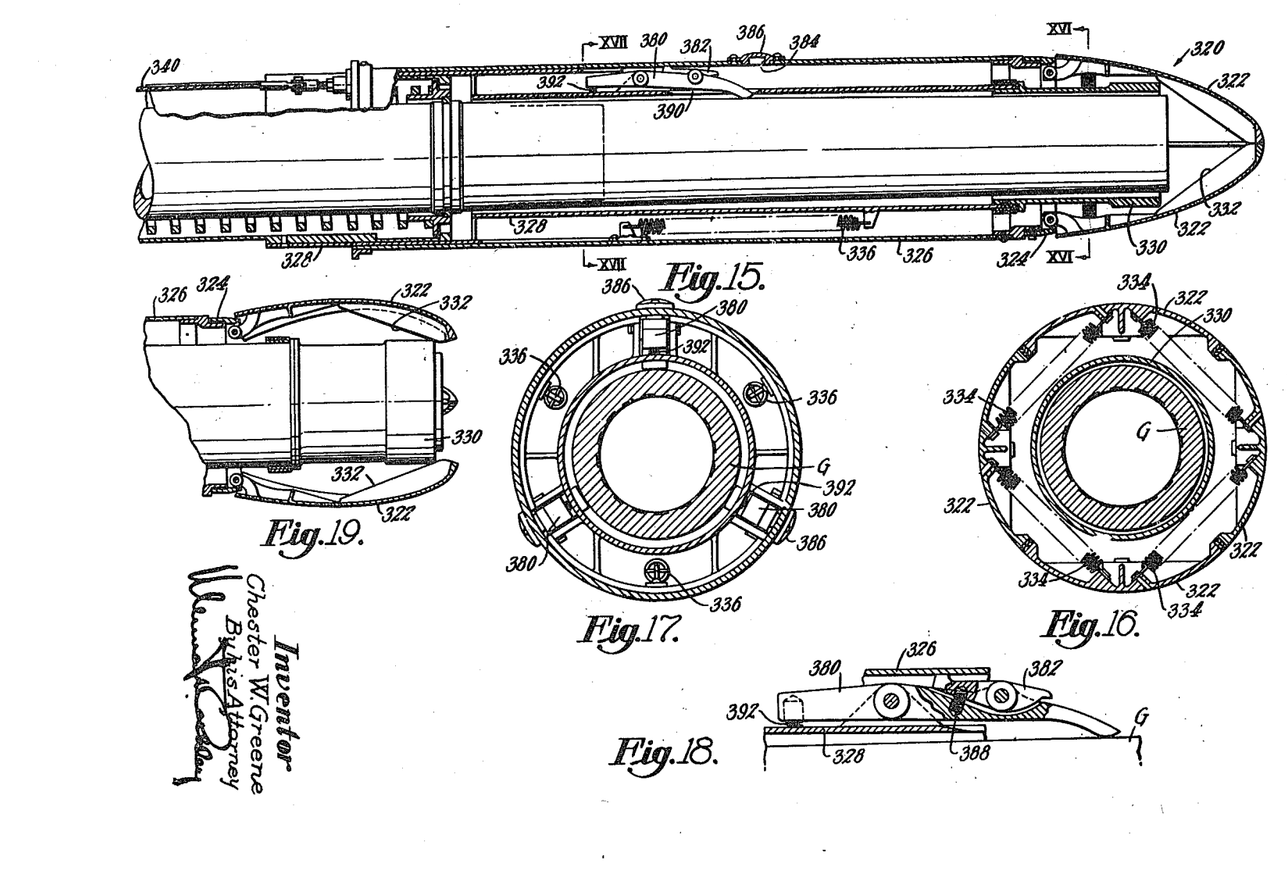
Fig. 15 is a vertical section through the muzzle cover and a portion of the actuating mechanism therefor.
Fig. 16 is a section on the line XVI—XVI of Fig. 15.
Fig. 17 is a section on the line XVII—XVII of Fig. 15.
Fig. 18 is a section through the mechanism for preventing closure of the muzzle cover in case of failure of the gun to fire.
Fig. 19 is a section through the muzzle cover in open position.

The cycle of operation of the gun is started with a round at the release station in position for the fuse-setting operation. A firing switch 317 (Fig. 31) is closed which, as will be described in detail later, initiates the operation of the fuse-setting mechanism at the conclusion of which the round is loaded into ramming position and another round indexed into the release station. In the event that no round is at the release station when the firing switch is closed the operation of the fuse setter is dispensed with and the rounds are immediately indexed in the magazine. For thus controlling the operation of the fuse-setting mechanism a switch 316 (Figs. 20 and 31) is mounted on the front frame member 42 in position to be engaged by a round when the round is moved into fuse-setting position. This engagement of the switch by the round moves the switch out of engagement with the lower pair of contacts (Fig. 31), into engagement with a second pair of contacts.

Inasmuch as the cycle of operation of the gun ends with the breech open and empty, the gun is provided with a muzzle cover 320 (Figs. 2 and 15) preventing the entrance of air through the gun when the gun is not in action. This cover consists of four plates or petals 322 pivoted on a ring 324 secured to a tube 326 which is slidable on a sleeve 328 surrounding the gun and secured to the gun carriage. To the forward end of the sleeve 328 is secured a blast tube 330 which cooperates with cam surfaces 332 carried by the inner sides of the petals 322 so that upon rearward movement of the tube 326 the petals are cammed outwardly to clear the muzzle end of the gun as shown in Fig. 19. With the tube 326 in its forward position the petals are held closed by tension spring 334 (Fig. 16) connected to adjacent parts of the petals and urging them inwardly into closed positions. The tube 326 is normally held in its forward position with the cover 320 closed, by springs 336 (Figs. 15 and 17) secured between the sleeve 328 and the tube 326.

Figure 10:
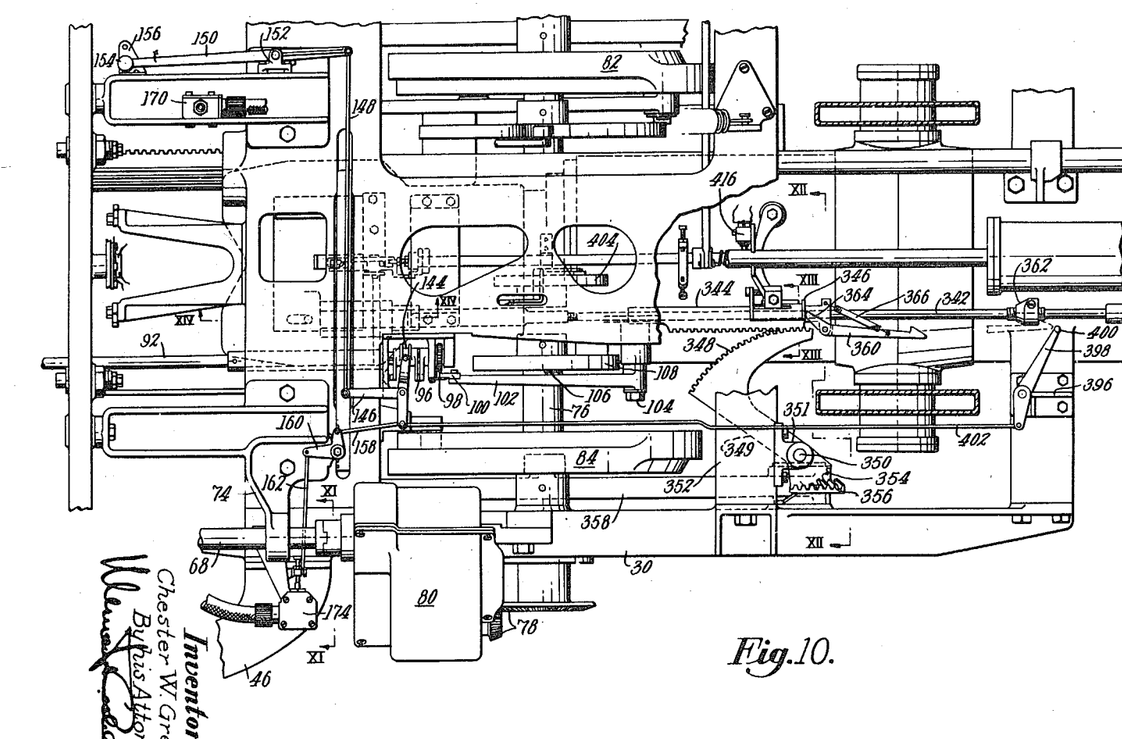
Fig. 10 is a plan view of the drive mechanism for the indexing, fuse setting, and loading of the rounds.
Figures 11, 13, 14:
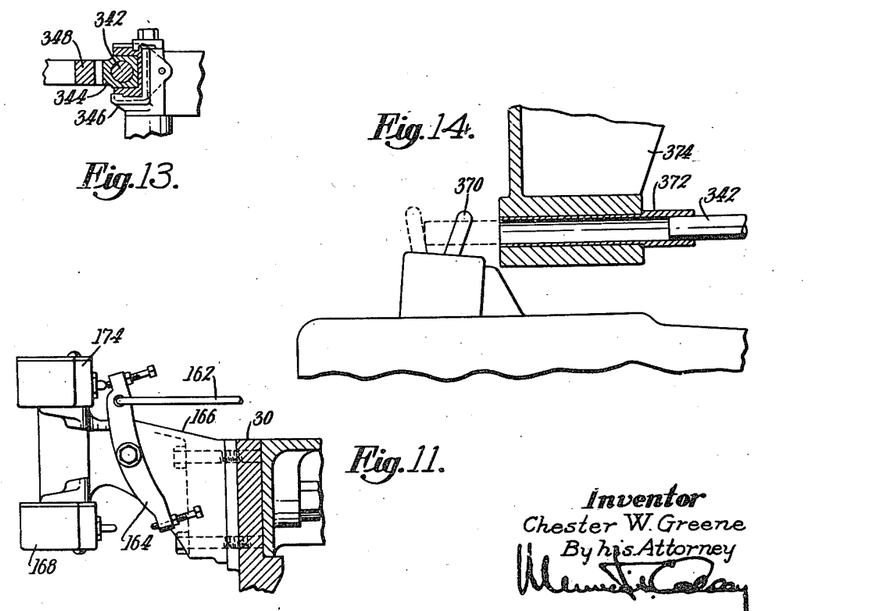
Fig. 11 is a section on the line XI—XI of Fig. 10.
Fig. 13 is a section on the line XIII—XIII of Fig. 10.
Fig. 14 is a section on the line XIV—XIV of Fig. 10.
Figure 12:
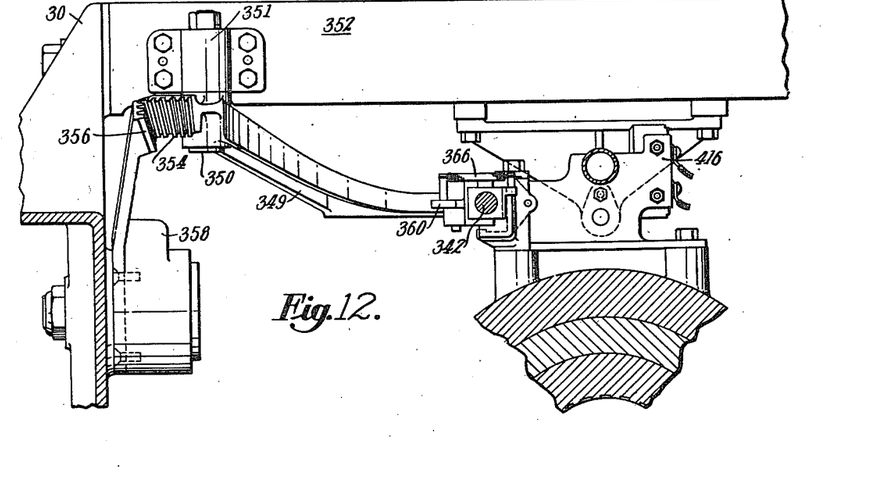
Fig. 12 is a section on the line XII—XII of Fig. 10.

The movement of the tube 326 is timed with that of the transfer tray T so that as the tray moves upwardly at the completion of the ramming operation and just prior to firing of the gun, the tube 326 is drawn rearwardly to open the muzzle cover 320. Secured to the rear end of the tube 326 is a cable 340 the rearward end of which is connected to a firing rod 342 (Figs. 1 and 2) which is slidable in a rack 344 (Figs. 10 and 13). The rack is mounted for sliding movement in a bracket 346 and is engageable with a gear segment 348 carried by the end of an arm 349 pivoted at 350 in a bracket 351 secured to a crossbar 352 carried by the side frame members 30 of the carriage. The arm 349 at its other end is formed as a gear segment 354 which meshes with a segment 356 carried by one of the arms 358 of the transfer tray. Thus, as the tray moves downwardly to carry the round into ramming position the rack 344 is moved forwardly with respect to the firing rod 342. Pivoted to the forward end of the rack is a latch 360 (Fig. 10) engageable with an adjustable collar 362 carried by the firing rod 342. With the rack in its rearward position the latch 360 is held in the position shown by engagement of a tail portion 364 thereof with the forward end of the bracket 346. As the rack 344 is moved forwardly during downward movement of the transfer tray a spring 366 urges the forward end of the latch toward the firing rod so that when the tray has reached its lowermost position the latch engages the forward end of the collar 362 as shown by broken lines in Fig. 10. After the round has been rammed into the gun by the rammer R, as described in detail in the aforementioned Haas application, the tray moves upwardly returning the rack 344 to the position shown in Fig. 10 and through the latch 360 causing rearward movement of the firing rod 342. This movement of the firing rod causes rearward movement of the tube 326 (Fig. 15) to which it is connected thereby to open the muzzle cover. After the cover has completely opened, the firing rod is moved into engagement with an arm 370 (Fig. 14) which is moved into the broken line position and operates the firing mechanism. The rear end of the firing rod is guided for movement in a sleeve 372 carried by a bracket 374 secured to the gun carriage. Thus it will be seen that the downward movement of the transfer tray moves the latch 360 into position to operate the firing rod and the upward movement of the tray operates the firing rod which first opens the muzzle cover and then causes firing of the gun.

In the event that the round in the gun fails to fire it is desirable to hold the muzzle cover open so that a second attempt may be made to fire the round. The latch 360 is withdrawn during the final return movement of the transfer tray to its uppermost position but the tube 326 (Fig. 15) is locked in its rearward position against the action of the springs 336 and is permitted to return to its forward position in response to the recoil movement of the gun. Pivoted to the sleeve 328, which is fixed to the gun cradle, are three arms 380 carrying at their forward portions latches 382 movable into recesses 384 formed in caps 386 carried by the tube 326, upon rearward movement of the tube to open the muzzle cover. Springs 388 (Fig. 18) act between the arms and the latches 382 to urge the latches into engagement with the inner side of the tube 326 and into locking engagement with the recesses 384 upon rearward movement of the tube. In the event that the gun fails to fire, the tube 326 is locked by these latches against the force exerted by the springs 336 so that the muzzle cover remains open. The forward ends of the arms 380 extend through openings 390 in the sleeve 328 and rest on the gun barrel. If the gun fires, the recoil movement carries the muzzle rearwardly to the broken line position shown in Fig. 15 whereupon the forward ends of the arms 380 are free to move inwardly under the influence of springs 392 acting between the rearward ends of the arms and the sleeve 328. This motion of the arms carries the pawls out of locking engagement with the tube 326 whereupon the springs 336 return the tube to its initial position and the muzzle cover remains closed until the next firing operation.

During loading of the magazine it is desirable to maintain the muzzle cover in closed position and the latch 360 (Fig. 10) is accordingly rendered inoperative to move the firing rod 342 rearwardly. Pivoted to a bracket 396 secured to the forward end of the gun carriage is an arm 398 carrying at one end a pin 400. When the arm is moved in a counterclockwise direction as viewed in Fig. 10, the pin is in position to engage the inclined forward surface of the latch 360, thus holding the latch away from the collar 362 so that upon subsequent rearward movement of the latch no movement is imparted to the firing rod 342. The other end of the arm 398 is connected by a link 402 to the bell crank lever 146 so that when the lever 150 is moved to loading position the arm 398 is moved to prevent engagement of the latch 360 with the collar 362 on the firing rod.

Figure 27:
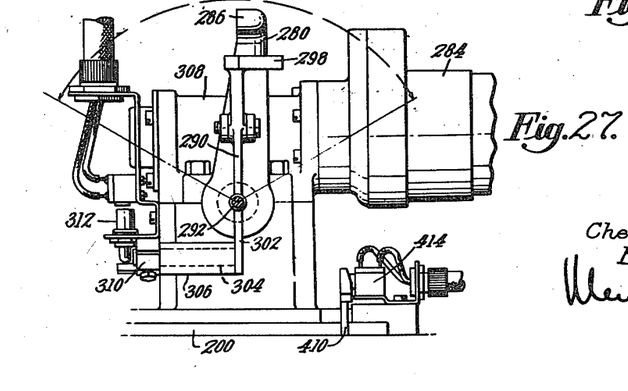
Fig. 27 is a section on the line XXVII—XXVII of Fig. 20.

The cam shaft 76 carries a cam 404 (Figs. 10 and 20) having a cam groove 406 which receives a cam roll 408 carried by the end of an arm 410 pivoted at 412 to a bracket depending from the support 200. The upper end of this arm extends through a slot in the support as shown in Fig. 27 and is arranged to actuate a switch 414 carried by the support 200 for moving the switch arm out of engagement with the contacts shown in Fig. 31 into engagement with the other set of contacts. This actuation of the switch takes place shortly after the cam shaft starts to rotate the switch, functioning to cause the fuse-setting mechanism to return to its initial position as will be hereinafter fully explained.

The mechanism also includes another switch 416 (Figs. 10 and 31) which is opened during firing of the gun and closes only after the gun returns to battery, the breech opened and the empty cartridge case ejected so that the gun is in condition to have another round loaded thereinto. This switch is operated in the same manner as fully described in the Haas application identified above to which reference may be made for a complete disclosure thereof.

In describing the operation it will be assumed first that the magazine is empty. Accordingly, in order to load it, the arm 150 (Fig. 10) is moved in the direction of the arrow throwing out the clutch 96 so that during the operation of the cam shaft 76 the gates 86 (Fig. 6) will remain closed. This movement of the arm 150 also opens the switch 174 (Fig. 31) and closes the switch 168. A round is inserted at one of the two loading stations after the latch 186 or 192 has been retracted to permit depression of the plates 178 or 194. Switch 170 is then closed causing energization of the solenoid 172 by completing a circuit from a line wire 420 through the switches 170, 168 and the solenoid to the return line 422. Energization of the solenoid 172 throws in the one-revolution clutch causing the cam shaft 76 to turn through one revolution and indexing the round away from the loading station. Following this, another round is inserted at the loading station and the process repeated until the magazine is full. During the loading operation the transfer tray will move up and down by reason of its driving connection with the cam shaft but no motion will be imparted to the firing rod 342 (Fig. 10) inasmuch as the pin 400 in the arm 398 prevents engagement of the latch 360 with the collar 362 carried by the firing rod. With the magazine loaded, control arm 150 (Fig. 10)

is returned to the position shown opening the switch 168 and closing the switch 174. A safety firing switch 424 is closed and the gun is ready to be fired. Inasmuch as there is a round at the release station the arm of switch 316 will be in its upper position in engagement with the upper pair of contacts. All other switches will be in the positions shown in Fig. 31 assuming that the breech is open and empty and the gun is in battery.

Figure 31:
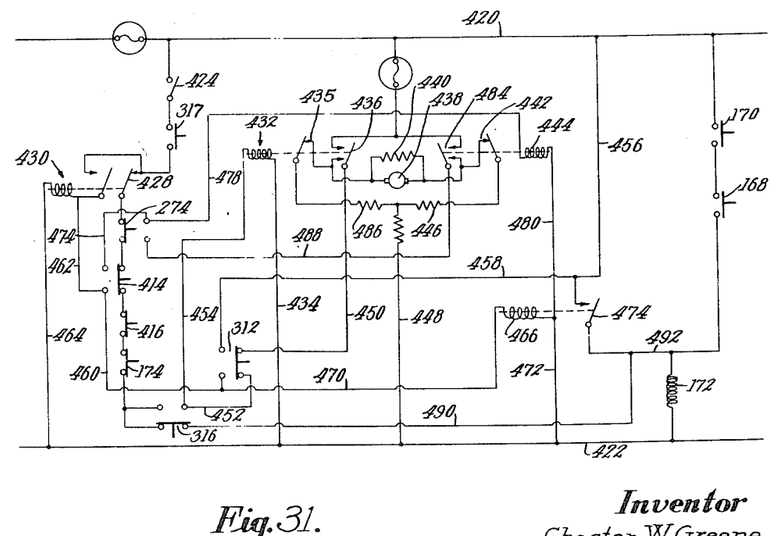
Fig. 31 is a wiring diagram of the electrical mechanism for controlling operation of the various mechanisms.

To fire the gun the operator closes the switch 317 which initiates the operation of the fuse-setting mechanism. It is assumed that the control arm 280 (Figs. 27 and 29) has been previously set to determine the proper amount of fuse-setting required. Upon closure of the switch 317 a circuit is established from the line wire 420 through switches 424, 317 and switch 428 of a relay 430, switches 274, 414, 416, 174, the upper contacts of switch 316, relay 432 and a wire 434 to the return line 422. Switches 435 and 436 of relay 432 are now moved toward the left opening the switch 435 and closing the switch 436. Current now flows through the fuse-setter motor from the line 420 through switch 436, armature 438 of the motor and the shunt field 440 through a switch 442 of a relay 444, a series field winding 446 and wire 448 to the return line 422. A maintaining circuit is closed at this time through the relay 432 so that the switch 316 need be only momentarily closed. This circuit runs from the line 420 through switch 436, wire 450, the switch 312, wires 452, 454, the coil of relay 432 and wire 434 to the return line 422. The fuse-setter motor now operates to turn the head 224 which is at this time in engagement with the nose of the round, the turning movement continuing until the stop arm 270 (Fig. 29) engages the control arm 280 at which time the switch 312 is operated to open the maintaining circuit just described and to close a circuit through the relay 430 as follows: From the line wire 420 through wires 456, 458, switch 312, wires 460, 462, coil of relay 430, and wire 464 to the return line 422. The relay switch 428 now opens thus opening the circuit through the relay 432 in the event that the operator should maintain the switch 317 closed.

The operation of switch 312 by the stop arm of the fuse-setting mechanism closes a circuit through the coil of a relay 466 as follows: From the line wire 420 through wires 456, 458, switch 312, wire 470, relay 466 and wire 472 to the line wire 422. The energization of relay 466 closes a relay switch 474 thus completing a circuit through the solenoid 172 throwing in the clutch controlling the cam shaft 76 and thus initiating operation of the cam shaft. During the early part of this operation the switch 414 is operated from the cam 404 (Figs. 10 and 27) to move the switch arm (Fig. 31) to the left, completing a circuit through the relay 444 from the line wire 420 through wires 456, 458, switch 312, wire 460, switch 414, wires 474, 478, coil of relay 444, wires 480, 472 to the return line 422. The energization of relay 444 causes current to flow through the fuse-setter motor from the line wire 420 through a switch 484 of the relay 444 through the armature and shunt field winding through the switch 435 of the relay 432 and a series field winding 486 and wire 448 to the return line 422. This causes the fuse-setter motor to rotate in the reverse direction back toward its zero position. The first portion of this movement causes the switch 312 to return to the position shown in Fig. 31 but a maintaining circuit is established through the relay 444 to maintain it energized at this time. This circuit is as follows: From the line 420 through the switch 484 of relay 444, wire 488, the right hand contacts of switch 274, wire 478, coil of relay 444 and wire 480 to return line 422. Accordingly, the fuse-setter motor will continue its rotation until it reaches zero or initial position at which time the switch 274 is moved by the plate 278 (Fig. 26) of the stop arm 270 into the position shown in Fig. 31. Relay 444 is now de-energized and the fuse-setting mechanism comes to rest.

At the beginning of the rotation of the cam shaft 76 and prior to the operation of the switch 414 to return the fuse setter to zero position, as described above, the fuse setter is moved forwardly along the splined shaft 226 out of engagement with the nose of the round. This is effected by the cam 246 moving the cam roll 248 outwardly and it will be noted that during this time the cam roll 408 moves along a portion of the cam groove 406 of cam 404 which is concentric with the cam shaft. After the fuse setter is out of engagement with the nose of the round the switch 414 is operated to rotate the fuse setter to its zero position. Meanwhile the gates 86 are opened by operation of the shaft 92 from the cam 108. During the latter part of the opening movement of the gates, the round is forced downwardly by the ejector 110 and the transfer tray now carries the round into alinement with the gun. The round is now loaded into the gun by a rammer R operated as in the aforementioned application and the breech is closed. During this time the rack 344 (Fig. 10) has been moved forwardly to engage the latch 360 with the collar 362 and the rack returned to the position shown by the upward movement of the transfer tray thereby moving the firing rod rearwardly, opening the muzzle cover and finally actuating the firing mechanism. During this loading operation the rounds have been indexed in the magazine so that a new round is in the release station positioned for the fuse-setting operation and just before the gun is fired the fuse setter is moved rearwardly thereby to engage the nose of another round. The cycle of operation ends after the gun is fired with the parts in the positions illustrated and with the muzzle cover closing the end of the gun providing the gun has been fired properly.

In the event no round is at the release station when the firing switch 317 is closed, a circuit is established directly through the clutch solenoid 172 starting operation of the cam shaft without operating the fuse-setter motor, thus immediately indexing the rounds in the magazine. This circuit is as follows: From the line wire 420, through switches 424, 317, 428 of relay 430, 274, 414, 416, 174, 316, wires 490, 492 and solenoid 172 to the return line 422.

The construction of the fuse setter is not claimed herein but forms the basis of application for Letters Patent of the United States, Serial No. 575,514, filed January 31, 1945, in the name of O. R. Haas.

Having thus described my invention what I claim as new and desire to secure by Letters Patent of the United States is:

1. In combination, a gun, a plurality of cover plates surrounding the muzzle end of the gun and meeting forwardly thereof to form an enclosure therefor, means supporting said plates for swinging movement outwardly of the gun to clear the muzzle for firing of the gun, mechanism for inserting ammunition into the gun and firing said gun, and means operated by said mechanism just prior to the firing of the gun for thus moving said plates.

2. In combination, a gun, a plurality of cover plates surrounding the muzzle end of the gun and meeting forwardly thereof to form an enclosure therefor, means supporting said plates for swinging movement outwardly of the gun to clear the muzzle for firing of the gun, mechanism for inserting ammunition into the gun and firing said gun, means operated by said mechanism just prior to the firing of the gun for thus moving said plates, and means operative upon recoil of the gun for returning said plates to closed positions.

3. In combination, a gun, a slidable tube surrounding the muzzle end of the gun, a muzzle cover carried by the forward end of the tube and arranged to be opened in response to rearward movement of the tube, means for firing the gun, and means operated by said last named means for moving said tube rearwardly just prior to the firing of the gun.

4. In combination, a gun, a slidable tube surrounding the muzzle end of the gun, a muzzle cover carried by the forward end of the tube and arranged to be opened in response to rearward movement of the tube, means for firing the gun, means operated by said last named means for moving said tube rearwardly just prior to the firing of the gun, means acting on said tube urging it forwardly of the gun to permit closure of the muzzle cover, means for locking said tube in its rearward position with the muzzle cover open, and means operative in response to the recoil of the gun for releasing said locking means whereupon the tube is moved forwardly after the gun has been fired.

5. In combination, a gun, a rounds magazine associated with said gun, means for indexing rounds in the magazine to a release station, means for transferring rounds from the release station into alinement with the bore of the gun and loading the rounds into the gun, means for firing the gun, a muzzle cover normally closing the muzzle end of the gun, and mechanism for operating said indexing means, said transferring means, said firing means and opening said muzzle cover in accordance with a predetermined sequence.

6. In combination, a gun, a rounds magazine associated with said gun, means for indexing rounds in the magazine to a release station, means for transferring rounds from the release station into alinement with the bore of the gun and loading the rounds into the gun, means for firing the gun, a muzzle cover normally closing the muzzle end of the gun, mechanism for operating said indexing means, said transferring means, said firing means and opening said muzzle cover in accordance with a predetermined sequence, means for locking said muzzle cover in open position, and means operative in response to the recoil of the gun for closing the muzzle cover after the gun has been fired.

7. In combination, a gun, a cover normally closing the muzzle end of the gun, a rounds magazine associated with said gun, a transfer device for carrying a round into alinement with the bore of the gun, means for ramming the round into the gun, means for firing the gun, means for indexing a round into position to be received by said transfer device, a drive shaft, means operative in response to rotation of the drive shaft for operating said indexing means, said transfer device and said ramming means in a predetermined sequence, and means operated by movement of the transfer device for opening the muzzle cover and then operating the firing means.

8. In combination, a gun, a cover normally closing the muzzle end of the gun, a rounds magazine associated with said gun, means for indexing rounds in the magazine, a transfer device, means for releasing rounds one at a time from the magazine to the transfer device, said transfer device being movable to carry the rounds into ramming position, means for ramming the rounds into the gun, means for firing the gun, a drive shaft arranged to operate the indexing means, the rounds-releasing means, the transfer device and the ramming means in accordance with a predetermined sequence, means operated by the transfer device for opening the muzzle cover and for operating the firing means, means for preventing opening of said rounds-releasing means during the loading of the magazine thereby rendering the transfer device ineffective to carry the rounds into ramming position, and means for simultaneously preventing opening of the muzzle cover by the transfer device, during loading of the magazine.

9. In combination, a gun, a rounds magazine associated therewith, means for indexing rounds in the magazine to a release station, means for setting the fuses of the rounds at the release station, means for transferring the rounds at the conclusion of the fuse-setting operation into alinement with the gun, means for ramming the rounds into the gun, means for firing the gun, a cover normally closing the muzzle end of the gun, a drive shaft arranged to operate said indexing means, said transferring means and said ramming means in a predetermined sequence, means operated by said fuse-setting apparatus at the conclusion of the fuse-setting operation for initiating operation of said drive shaft, and means operated by said transfer means for opening said muzzle cover and operating said firing mechanism.

10. In combination, a gun, a rounds magazine associated therewith, means for indexing rounds in the magazine to a release station, mechanism for setting the fuses of the rounds at the release station, means for transferring the rounds at the conclusion of the fuse-setting operation into alinement with the gun, means for ramming the rounds into the gun, means for firing the gun, a cover normally closing the muzzle end of the gun, a drive shaft arranged to operate said indexing means, said transferring means and said ramming means in a predetermined sequence, means operated by said fuse-setting mechanism at the conclusion of the fuse-setting operation for initiating operation of said drive shaft, means operated by said transferring means for opening said muzzle cover and operating said firing mechanism, means for rendering said fuse-setting mechanism inoperative during loading of the magazine, other means for initiating operation of said drive shaft to cause indexing of the rounds therein following the loading of each round in the magazine, and means for rendering said transferring mechanism ineffective to carry rounds from the magazine into ramming position and to cause opening of the muzzle cover during loading of the magazine.

11. In combination, a gun, a rounds magazine, means for indexing rounds in the magazine to a release station, fuse-setting mechanism arranged to set the fuse of a round at the release station, means operative in response to a predetermined operation of the fuse setter for loading the round into the gun, a muzzle cover normally closing the muzzle end of the gun, and means operated by said loading means for opening the muzzle cover and for firing the gun.

CHESTER W. GREENE.

REFERENCES CITED

The following references are of record in the file of this patent:

UNITED STATES PATENTS

| Number | Name | Date |
| --- | --- | --- |
| 44,631 | Hull | Oct. 11, 1864 |
| 587,731 | Hammer | Aug. 10, 1897 |
| 1,334,801 | Schneider | Mar. 23, 1920 |

FOREIGN PATENTS

| Number | Country | Date |
| --- | --- | --- |
| 314,992 | (Ger.) | Oct. 20, 1919 |